United States Patent [19]

Tomita

[11] Patent Number: 4,625,911
[45] Date of Patent: Dec. 2, 1986

[54] AIR CONDITIONER SYSTEM FOR AUTOMOBILES

[75] Inventor: Itizo Tomita, Konan, Japan

[73] Assignee: Diesel Kiki Co., Ltd., Tokyo, Japan

[21] Appl. No.: 735,178

[22] Filed: May 17, 1985

[30] Foreign Application Priority Data

| May 18, 1984 [JP] | Japan | 59-100253 |
| May 18, 1984 [JP] | Japan | 59-100254 |
| May 18, 1984 [JP] | Japan | 59-100255 |
| May 18, 1984 [JP] | Japan | 59-100256 |

[51] Int. Cl.⁴ ............................................. B60H 1/02
[52] U.S. Cl. ........................... 237/12.3 C; 237/12.3 A
[58] Field of Search ................... 237/12.3 C, 12.3 A, 237/2 A; 98/2.05; 165/42, 43

[56] References Cited

U.S. PATENT DOCUMENTS 2,191,177  2/1940  McCollum ................... 237/12.3 C
2,794,601  6/1957  Steadman et al. .......... 237/12.3 C Primary Examiner—Henry Bennett
Attorney, Agent, or Firm—Wenderoth, Lind & Ponack

[57] ABSTRACT

An air conditioner system for an automotive vehicle comprises a main heat exchanger disposed in a main duct for subjecting air to heat-exchanging process while the air passes through the main duct means, and an auxiliary heater disposed in a bypass duct whose inlet and outlet openings communicate with the main duct, respectively, upstream and downstream of the main heat exchanger. While the engine is cold, air is supplied from the inlet opening into the bypass duct where it is heated by the auxiliary heater. The heated air is discharged from the outlet opening to the main duct, then to the vehicle passenger compartment. Thus the vehicle passenger compartment can be heated soon after the engine is started from a cold condition.

6 Claims, 3 Drawing Figures

AIR CONDITIONER SYSTEM FOR AUTOMOBILES

BACKGROUND OF THE INVENTION

The present invention relates to air conditioner systems for automotive vehicles, and more particularly to such an air conditioner system including an auxiliary heater.

There are known various air conditioner systems which generally include a heater core disposed in an air flow duct for heating air flowing therethrough to a vehicle passenger compartment. The air while passing through the heater core is subjected to a heat-exchange relationship with engine cooling water which is circulating through the heater core to give up heat to the air. A drawback of such known air conditioner systems lies in the difficulty of producing a sufficient heating effect while the engine and accordingly the engine cooling water is cold, particularly when the engine is started from a cold condition. It has therefore been long desired to devise an air conditioner system capable of supplying hot air soon after the engine is started from a cold condition.

As disclosed in Japanese Utility Model Laid-Open Publication No. (JP-A) 57-127116, an improved air conditioner system includes a combustion heater for heating engine cooling water before it is circulated through a heater core. This air conditioner system is still disadvantageous in that the engine cooling water has a relatively large specific heat, requiring a considerable period of time to be heated to an elevated temperature high enough to cause a rapid increase in the temperature of air passing through the heater core.

SUMMARY OF THE INVENTION

It is therefore an object of the present invention to provide an air conditioner system for an automotive vehicle which can eliminate the foregoing drawbacks of the prior art and is capable of supplying hot air to a vehicle passenger compartment even when the engine is cold.

Another object of the present invention is to provide an air conditioner system including an auxiliary heater which is simple in structure and effective to cause a sudden increase in the temperature of air to be thereafter supplied to a vehicle passenger compartment.

A further object of the present invention is to provide an automotive vehicle air conditioner system including an auxiliary heater operative in proportion to the engine r.p.m.

According to the present invention, there is provided an air conditioner system for an automotive vehicle, comprising: main duct means having an end opening to the passenger compartment; a blower disposed in said main duct means for forcing air through said main duct means to the passenger compartment; main heat-exchanging means disposed in said main duct means for subjecting the air to a heat-exchanging process while the air passes through said main duct means; bypass duct means having an inlet communicating with said main duct means upstream of said main heat-exchanging means, and an outlet communicating with said main duct means downstream of said main heat-exchanging means; and auxiliary heating means disposed in said bypass duct means for heating air passing through said bypass duct means.

Many other advantages, features and additional objects of the present invention will become manifest to those versed in the art from the detailed description and the accompanying sheets of drawings in which preferred structural embodiments incorporating the principles of the present invention are shown by way of illustrative example.

DETAILED DESCRIPTION

The present invention will now be described in greater detail with reference to the illustrated embodiments.

Figure 1:
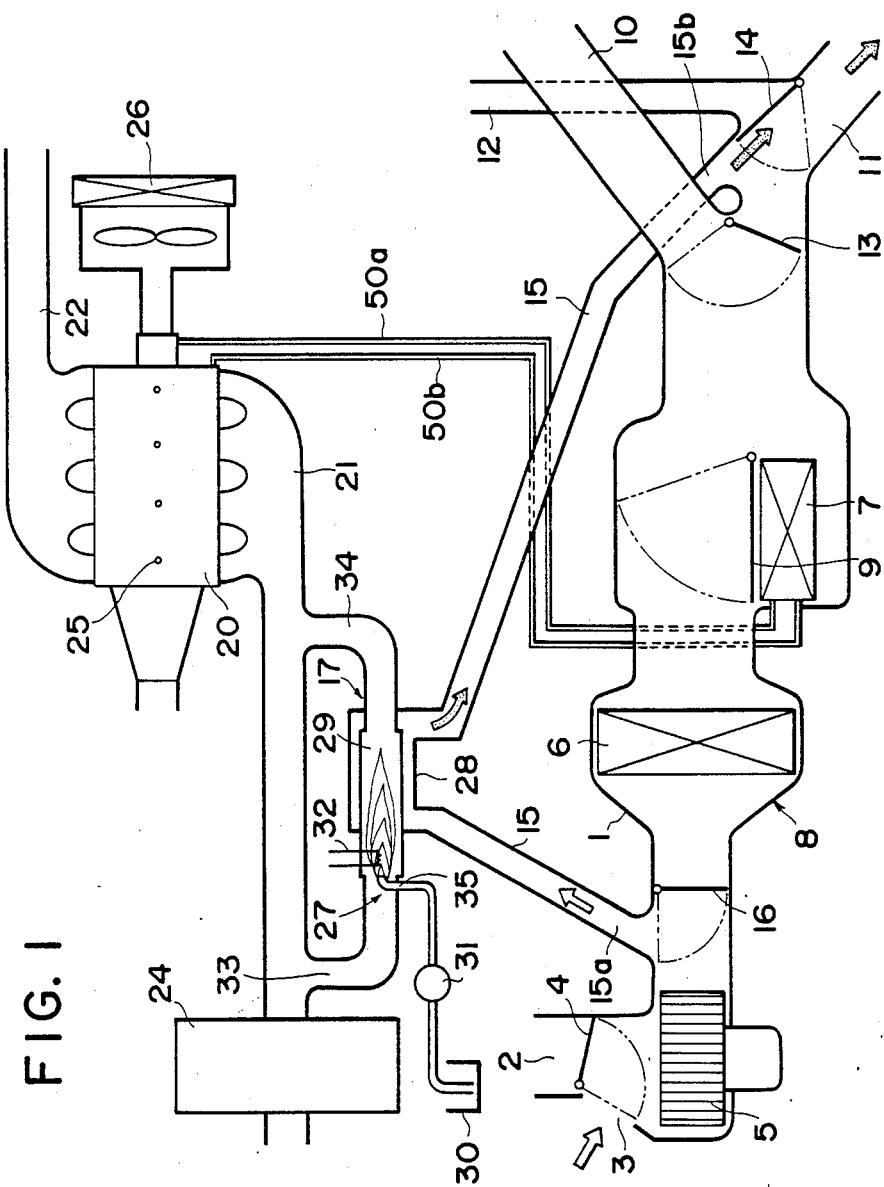
FIG. 1 is a schematic view of a vehicle air conditioner system embodying the present invention.

Referring now to FIG. 1, there is shown a first embodiment of an air conditioner system according to the invention. The air conditioner system comprises a main air flow duct 1 having an outside air inlet 2 and a recirculated air inlet 3 that are provided in branched fashion. A door 4 is disposed in the duct 1 to enable selection of one of the inlets 2 and 3.

A blower 5 is disposed in the duct 1 immediately downstream of the inlets 2 and 3 to force air through the duct 1 from left to right either from the outside air inlet 2 or the recirculated air inlet 3. Disposed in the duct 1 downstream of the blower 5 is a heat exchanger 8 including an evaporator 6 and a heater core 7.

The evaporator 6 is provided to cool the air passing therethrough and constitutes a part of a refrigerant system including a compressor, a condenser, a liquid tank and an expansion valve (none not shown). The heater core 7 disposed downstream of the evaporator 6 heats the air passing through the duct 1 and, by means of pipes 50a and 50b, it is incorporated in a hot water system through which engine cooling water is circulated for cooling an engine 20. An air mix damper or door 9 is provided in front of the heater core 7 to control the amount of air passing through the heater core 7 and thereby the temperature of the air passing through the duct 1. The air mix door 9 is driven by a suitable actuator (not shown).

The temperature controlled air is discharged into a vehicle passenger compartment (not shown) through an upper air outlet 10, a lower air outlet 11, and a defroster outlet 12. A control door 13 is disposed at the junction between the upper and lower air outlets 11 and 12 to select one of these outlets 11 and 12. Likewise, a control door 14 selects the lower air outlet 12 or the defroster outlet 12. Although not shown, there is provided a control unit operatively connected to the blower 5, the compressor and the air mix door 9 for controlling the blower r.p.m., the operation of the compressor and the angular movement of the door 9.

The air conditioner system further comprises a bypass duct 15 having an inlet 15a communicating with the main duct 1 upstream of the heat exchanger 8, and an outlet 15b communicating with the main duct 1 downstream of the heat exchanger 8. More specifically, the inlet 15a opens at a position between the blower 5 and the heat exchanger 8 whereas the outlet 15b opens at a position immediately upstream of the control door 14. As an alternative, the outlet 15b may communicate with the main duct 1 immediately upstream of the control door 13. A control door 16 is disposed in the main duct 1 adjacent to the inlet 15a to select one of the main duct 1 and the bypass duct 15. An auxiliary heating means 17 is disposed in the bypass passage 15 substantially at the midpoint thereof. While the auxiliary heating means 17 is in operation, the control door 16 is moved to the position indicated by solid lines, thereby opening the inlet 15a.

The engine 20 for driving the vehicle is shown in the form of a diesel engine which includes an intake manifold 21, an exhaust manifold 22 and an air cleaner 24 connected to an inlet of the intake manifold 21. Air is drawn through the air cleaner 24 and the intake manifold 21 into individual cylinders in the engine 20 and is compressed to a high degree. As a result of this high compression the air is heated to a prevailing high temperature. Fuel is then injected from injection nozzles 25 into the respective cylinders. Because of the prevailing high temperature, the fuel ignites spontaneously and combustion takes place. The thermal energy which is released when the fuel is burned is converted into mechanical energy via pistons and a crankshaft of the engine 20. The circulating engine cooling water takes up the thermal energy to cool the engine 20 and superfluous heat is radiated outside the vehicle from a radiator 26. A part of the thermal energy is supplied to the heater core 7 through the pipes 50a and 50b.

The auxiliary heating means 17 comprises a combustion device 27 including a burner nozzle 35 disposed in a combustion chamber 29, and an ignition device 32 such as a sparking plug or a glow plug disposed adjacent to the burner nozzle 35 for igniting a fuel which is sucked from a fuel tank 30 and supplied under pressure to the burner nozzle 35 by means of a pump 31. The combustion chamber 29 is disposed in a portion of the bypass duct 15 so that such bypass duct portion and the combustion chamber 29 together constitue an auxiliary heat exchanger 28. The fuel pump 31 is of the fixed capacity type and may be a diaphragm pump, a plunger pump or a rotary pump. In the diesel engine 20 as illustrated, a fuel injection pump may be utilized. The operation of the fuel pump 31 and accordingly the operation of the combustion device 21 is controlled depending upon the temperature of the engine cooling water and the ambient temperature detected by suitable sensor means, not shown. For instance, the combustion device 21 is operated to burn the fuel under the condition that the temperature of the engine cooling water is below a predetermined value, such as 55° C. and the temperature of ambient temperature is below a predetermined value, such as 10° C. Combustion is continued until the temperature of the engine cooling water is elevated at a predetermined value which is high enough to give heat to air passing through the heater core 7, thereby enabling the air to heat the vehicle passenger compartment. Such temperature is detected by the sensor means whereupon the operation of the pump 31 is stopped.

The combustion chamber 29 is connected in parallel to the intake manifold 21 by an intake passage 33 and an exhaust passage 34. The intake passage 33 opens to the intake manifold 21 on the inlet side thereof whereas the exhaust passage 34 opens to the intake manifold 21 on the outlet side thereof. Thus, the passages 33 and 34 and the combustion chamber 29 jointly constitute a bypass passage in respect of the intake manifold 21. When the engine is running, the suction is developed in the bypass passage, causing air to be drawn into the combustion chamber 29 through the intake passage 33.

In the auxiliary heat exchanger 28, the air from the bypass duct 15 receives heat from the hot combustion gas as it flows around the combustion chamber 29. The heated air then is discharged into the bypass duct 15.

The vehicle air conditioner system thus constructed operates as follows: In the winter, the system is set in the heating mode of operation. When the engine 20 is started from a cold condition, the blower 5 is driven to force air through the main duct 1. In this instance, the auxiliary heating means 17 is operated since the temperature of the engine cooling water is below the predetermined value. To this end, the fuel pump 31 is driven to supply fuel to the burner nozzle 35 from which the fuel is injected into the combustion chamber 29 and ignited by the ignition device 32. At the same time, air is drawn from the intake manifold 21 through the intake passage 33 into the combustion chamber 29. The hot combustion gas is discharged into the intake manifold 21 through the exhaust passage 34.

Then the control door 16 is brought to the solid line position to open the inlet 15a of the bypass duct 15 whereupon the air fed by the blower 5 is caused to flow through the bypass duct 15 into the auxiliary heat exchanger 28 of the auxiliary heating means 17. The air after having been heated by the heat exchanger 28 flows through the bypass duct 15 into the main duct 1 and finally it is discharged into the passenger compartment through the lower air outlet 11. With the auxiliary heating means 17 thus operated, the passenger compartment can be heated soon after the engine 20 is started from a cold condition even when the engine cooling water is cold.

The auxiliary heating means 17 while in operation continues to supply the hot combustion gas to the engine while the engine is still cold, thus improving the starting engine performance. Even while the engine 20 is idling or warming up, the auxiliary heating means 17 may be operated unless the engine cooling water is heated to the predetermined elevated temperature.

The air conditioner system according to the invention has various advantages: With the auxiliary heating means provided, the air conditioner system can heat the vehicle passenger compartment soon after the engine is started from a cold condition and even while the engine cooling water is cold. The hot combustion gas supplied from the auxiliary heating means warms the engine and improves the starting engine performance. Such hot combustion gas also enables the engine to operate stably without knocking while the engine is idling. The combustion chamber of the auxiliary heating means is connected in parallel to the intake manifold by means of the intake and exhaust passages with the result that air can be drawn into the combustion chamber due to suction developed while the engine is operating. Thus, a separate blower is not needed for introducing air into the combustion chamber.

Figure 2:
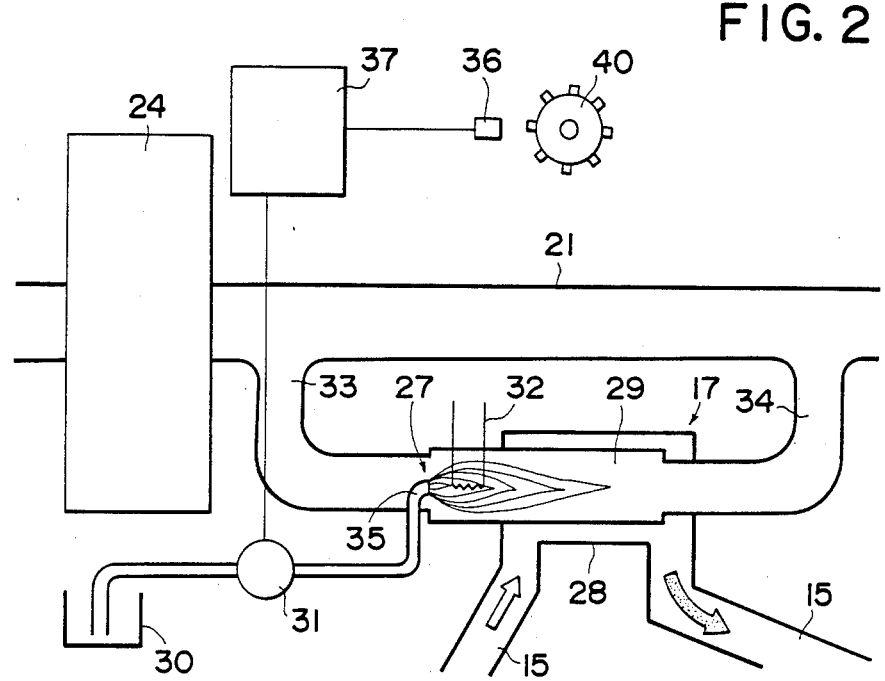
FIG. 2 is a schematic view of a modified arrangement of the present invention.

A modified air conditioner system embodying the present invention is shown in FIG. 2 where like parts are designated by the same reference numerals. The modified system is similar to the system shown in FIG. 1 but differs therefrom in that a fuel pump 31 is of the variable capacity type. Thus where a diaphragm pump or a plunger pump is used the capacity of such pump can be varied by controlling the size of the stroke or the number of strokes. The capacity of a rotary pump varies with the r.p.m. To adjust the capacity of the fuel pump 31 in proportion to the engine r.p.m., an r.p.m. sensor 36 detects the r.p.m. of a crankshaft 40 of the engine and produces a signal representing the engine r.p.m. detected. The signal is sent to a control circuit 37 where it is processed and converted into a suitable control signal which is finally sent to the fuel pump 31 to vary the capacity thereof in proportion to the engine r.p.m. In place of such a separate pump, the internal pressure in the chamber of a fuel injection pump of the diesel engine can be utilized.

With this arrangement, since both the amount of air drawn into the combustion chamber 29, and the amount of fuel supplied to the burner nozzle vary in proportion to the engine r.p.m., combustion takes place with an optimum fuel air ratio without causing undesirable incomplete combustion or blowing out.

According to this arrangement, the pump capacity increases with the engine r.p.m., so that a maximum amount of heat radiation of the system should be set for safety. The amount of fuel supply is determined by the volume of the passenger compartment, the ambient temperature, or like other factors.

Figure 3:
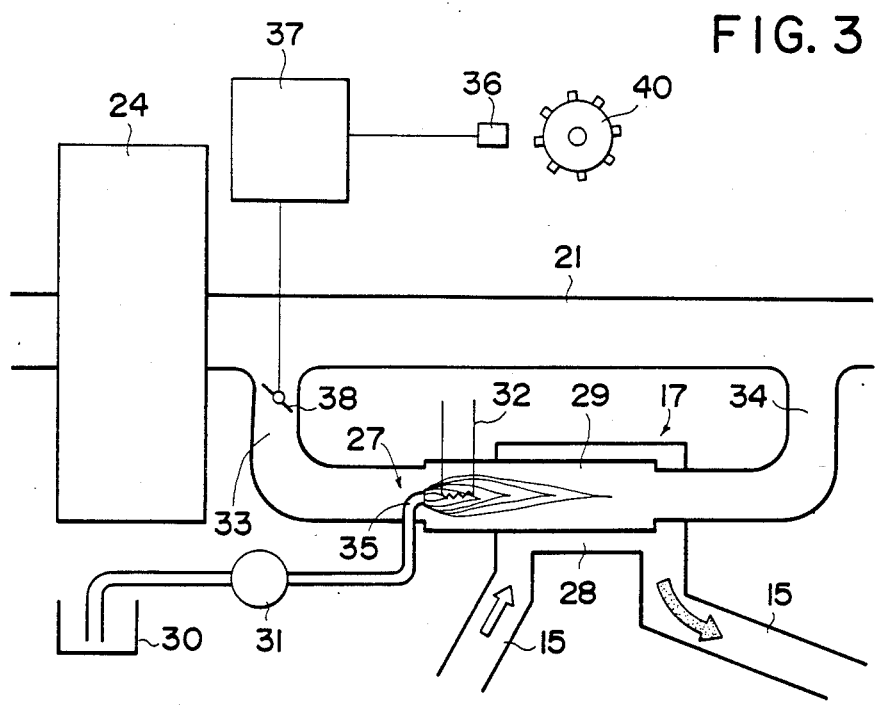
FIG. 3 is a view similar to FIG. 2, showing another modification according to the present invention.

Another modified air conditioner system shown in FIG. 3 is substantially the same as the system of FIG. 2 with the exception that the fuel pump 31 is of the fixed capacity type and a flow control valve 38 is provided in the intake passage 34 to control the open area of the passage 34 in proportion to the engine r.p.m. To this end the system includes an engine r.p.m. sensor 36 for detecting the r.p.m. of a crankshaft 40, and a control circuit 37 for processing the signal from the sensor 36 and sending a control signal to the flow control valve 38. The flow control valve 38 is held in a fully open position when the engine is started from a cold condition, and it is moved to gradually close the intake passage 33 as the engine r.p.m. increases beyond the idling r.p.m., thus maintaining the amount of air drawn into the combustion chamber 29 at a constant value.

With the valve 36 controlled to vary the open area of the intake passage 33 in proportion to the engine r.p.m., the amount of air drawn to the combustion chamber 29 can be maintained at a constant value. This ensures that combustion takes place with an optimum fuel air ratio without incomplete combustion or blowing out.

Although in the illustrated embodiment the flow control valve 36 is disposed in the intake passage 33, it may be possible to dispose such valve 36 in the exhaust passage 34. Further, two such valves 36 may be disposed in the intake and exhaust passages 33 and 34, respectively, in which instance the air supply can be blocked completely to end the combustion.

Obviously, many modifications and variations of the present invention are possible in the light of the above teachings. It is therefore to be understood that within the scope of the appended claims, the invention may be practiced otherwise than as specifically described.

What is claimed is:

1. An air conditioner system for an automotive vehicle including a passenger compartment and an engine with an air intake manifold connected thereto, said air conditioner system comprising:
conditioned air duct means having the downstream end opening into the passenger compartment;
a blower disposed in said duct means for forcing air through said duct means into the passenger compartment;
main heat exchanging means disposed in said duct means for subjecting the air to heat-exchange while the air passes through said duct means; and
an auxiliary heating means in said duct means for heating air to be supplied to the passenger compartment, said auxiliary heating means including a combustion device having a combustion chamber, a fuel pump for supplying fuel thereto, a burner in said combustion chamber and connected to said pump for injecting the fuel into said combustion chamber, and an air flow passage connected to said combustion chamber for supplying air thereinto, said air flow passage including an intake passage having one end connected to one end of said combustion chamber and an exhaust passage having one end connected to the other end of said combustion chamber, the other ends of said intake and exhaust passages being connected with the intake manifold for connecting said air flow passage and combustion chamber in parallel with said intake manifold.

2. An air conditioner system for an automotive vehicle including a passenger compartment and an engine with an air intake manifold mounted thereon, said air conditioner system comprising:
(a) main duct means having the downstream end opening into the passenger compartment;
(b) a blower disposed in said main duct means for forcing air through said main duct means into the passenger compartment;
(c) main heat-exchanging means disposed in said main duct means for subjecting the air to heat-exchange while the air passes through said main duct means;
(d) bypass duct means having an inlet communicating with said main duct means upstream of said main heat-exchange means, and an outlet communicating with said main duct means downstream of said main heat-exchange means; and
(e) auxiliary heating means disposed in said bypass duct means for heating air passing through said bypass duct means, said auxiliary heating means including a combustion device having a combustion chamber disposed in said bypass duct means, a fuel pump for supplying fuel, a burner in said combustion chamber and connected to said fuel pump for injecting the fuel into said combustion chamber, and an air flow passage connected to said combustion chamber for supplying air thereinto, said air flow passage including an intake passage having one end connected to one end of said combustion chamber and an exhaust passage having one end connected to the other end of said combustion chamber, the other ends of said intake and exhaust passages being connected with said intake manifold for connecting said air flow passage and combustion chamber in parallel with said intake manifold.

3. An air conditioner system as claimed in claim 2 in which said fuel pump has a capacity which is variable in proportion to the r.p.m. of the engine.

4. An air conditioner system as claimed in claim 3 further comprising means connected to said fuel pump for controlling the operation of the fuel pump to vary the capacity in proportion to the r.p.m. of the engine.

5. An air conditioner system as claimed in claim 2 further comprising a flow control valve disposed in said air flow passage.

6. An air conditioner system as claimed in claim 5 further comprising means connected to said flow control valve for controlling said flow control valve to vary the open area of said air flow passage in proportion to the r.p.m. of the engine.

* * * * *